(12) United States Patent
Baker et al.

(10) Patent No.: US 6,903,728 B1
(45) Date of Patent: Jun. 7, 2005

(54) STATE-BASED CONTROL OF A TERMINAL USER INTERFACE CONTAINING SOFT-LABELED KEYS

(75) Inventors: Albert D. Baker, Lincroft, NJ (US); James Cheng-Pin Liu, Holmdel, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 901 days.

(21) Appl. No.: 09/272,956

(22) Filed: Mar. 19, 1999

(51) Int. Cl.[7] ................................................. G09G 5/00
(52) U.S. Cl. ........................ 345/169; 345/172; 345/173; 345/740; 455/566
(58) Field of Search ................................ 345/172, 141, 345/173, 169, 740; 379/201, 202, 93.17, 93.19, 93.01, 93.23, 93.25, 914–916; 455/566, 575, 563, 564

(56) References Cited

U.S. PATENT DOCUMENTS

| | | | | |
|---|---|---|---|---|
| 5,386,459 A | * | 1/1995 | Veeneman et al. | 379/201 |
| 5,416,831 A | * | 5/1995 | Chewning, III et al. | 379/96 |
| 5,422,656 A | * | 6/1995 | Allard et al. | 345/173 |
| 5,425,077 A | * | 6/1995 | Tsoi | 455/566 |
| 5,483,251 A | * | 1/1996 | Dagdeviren | 345/141 |
| 5,615,257 A | * | 3/1997 | Pezzullo et al. | 379/396 |
| 5,737,394 A | * | 4/1998 | Anderson et al. | 379/88.11 |
| 5,956,655 A | * | 9/1999 | Suzuki et al. | 455/566 |
| 5,999,827 A | * | 12/1999 | Sudo et al. | 455/564 |
| 6,195,545 B1 | * | 2/2001 | Baker et al. | 455/414 |

OTHER PUBLICATIONS

Definity® Enterprise Communications Server, Release 6, Administration and Feature Description, "Bridged Call Appearance," pp. 4–109 to 4–124, Aug. 1997.

Definity® Enterprise Communications Server, Release 6, Administration and Feature Description, "Terminal Translation Initialization," pp. 4–562 to 4–569, Aug. 1997.

* cited by examiner

*Primary Examiner*—Lun-Yi Lao
(74) *Attorney, Agent, or Firm*—Ryan, Mason & Lewis, LLP (57) ABSTRACT

Soft-labeled keys (SLKs) of a wireless terminal or other type of terminal in a communication system are controlled in an efficient manner using a state-based control model. In an illustrative embodiment, a state machine is generated such that each state in the state machine specifies a set of labels for a corresponding set of soft-labeled keys associated with the wireless terminal. At least a portion of the state machine is downloaded from a switch of the system, and processed to generate a display including a given one of the sets of labels. The state machine may be in the form of a state transition table which includes, for each state, (i) a set of labels for the set of soft-labeled keys, (ii) a set of feature identifiers, e.g., system codes, each identifying, for a given one of the labels, a particular feature supported by the switch, and (iii) a next state which is entered when the corresponding soft-labeled key is selected by the user. After a given one of the soft-labeled keys is selected by a user, the corresponding feature identifier is transmitted from the wireless terminal to the switch. The state transition table may also support a local mode in which selecting a particular SLK in a given state causes the terminal to execute a specified local program, after which the terminal returns to the given state. Updating of the display may be controlled locally by the wireless terminal, or by the switch sending an indication of the next state to the wireless terminal.

24 Claims, 6 Drawing Sheets

| CURRENT SID | SLK NO. | SLK LABEL | SYSTEM BUTTON ID | NEW SID | ACTIVITY LIST |
|---|---|---|---|---|---|
| 1 | 1 | "1A" | 11 | 2 | |
|   | 2 | "1B" | 12 | 3 | |
|   | 3 | "1C" | 13 | 4 | |
|   | 4 | "1D" | 14 | 5 | |
| 2 | 1 | | | | |
|   | 2 | | | | |
|   | 3 | | | | |
|   | 4 | | | | |
| 3 | 1 | | | | |
|   | 2 | | | | |
|   | 3 | | | | |
|   | 4 | | | | |
| 4 | 1 | | | | |
|   | 2 | | | | |
|   | 3 | | | | |
|   | 4 | | | | |
| 5 | 1 | | | | |
|   | 2 | | | | |
|   | 3 | | | | |
|   | 4 | | | | |

FIG. 6A

| CURRENT SID | SLK NO. | SLK LABEL | SYSTEM BUTTON ID | NEXT (NEW)SID | ACTIVITY LIST |
|---|---|---|---|---|---|
| ANY | INCOMING CALL OR [LINE] BUTTON | ANY | ANY | 2a | |
| 1a (HOME) | 1 | DIR | 20 | 6a | |
| | 2 | REDIAL | 21 | 2a | |
| | 3 | SAC | 22 | 1a | INVERSE VIDEO ICON (REDIR) |
| | 4 | <more> | – | 1b | |
| 1b (FEATURE STATE) | 1 | f1 | – | | |
| | 2 | f2 | – | | |
| | 3 | f3 | – | | |
| | 4 | <more> | – | 1c | |
| 1c (FEATURE STATE) | 1 | f4 | – | | |
| | 2 | f5 | – | | |
| | 3 | LOCAL | – | | |
| | 4 | <more> | – | 1a | |
| 2a (OFFHOOK STATE) | 1 | CONF | 3 | 3a | PRESS HARD BUTTONS {CAs} AND INCOMING CALL WILL LEAD INTO THIS SID |
| | 2 | TRANS | 4 | 4a | |
| | 3 | HOLD | 5 | 5a | |
| | 4 | <more> | – | 2b | |
| 2b (FEATURE STATE) | 1 | f6 | – | | |
| | 2 | f7 | – | | |
| | 3 | f8 | – | | |
| | 4 | <more> | – | 2c | |
| 2c (FEATURE STATE) | 1 | f9 | – | | |
| | 2 | f10 | – | | |
| | 3 | f11 | – | | |
| | 4 | <more> | – | 2a | |
| 3a (CONF STATE) | 1 | DROP | 2 | 3a | 2:2 OR LESS PARTIES IN CALL 3:3 OR MORE PARTIES IN CALL |
| | 2 | ADD | 3 | 3a/7a | GOTO STATE 7a WHEN MORE THAN 6 PARTIES IN THE CONFERENCE CALL |
| | 3 | HOLD | 5 | 5a | |
| | 4 | <more> | – | 3b | |
| 3b (FEATURE STATE) | 1 | f12 | – | | |
| | 2 | f13 | – | | |
| | 3 | f14 | – | | |
| | 4 | <more> | – | 3c | |

FIG. 6B

| | | | | | |
|---|---|---|---|---|---|
| 3c (FEATURE STATE) | 1 | f15 | – | | |
| | 2 | f16 | – | | |
| | 3 | f17 | – | | |
| | 4 | <more> | – | 3a | |
| 4a (TRANS STATE) | 1 | TRANS | 4 | 1a | |
| | 2 | EXIT/NORMAL | 13 | 2a | |
| | 3 | {blank} | – | | |
| | 4 | <more> | – | 4b | |
| 4b (FEATURE STATE) | 1 | f18 | – | | |
| | 2 | f19 | – | | |
| | 3 | f20 | – | | |
| | 4 | <more> | – | 4c | |
| 4c (FEATURE STATE) | 1 | f21 | – | | |
| | 2 | f22 | – | | |
| | 3 | f23 | – | | |
| | 4 | <more> | – | 4a | |
| 5a (HOLD STATE) | 1 | CONF | 3 | 3a | PRESS HARD BUTTONS {CAs} WILL LEAD TO SID:2 |
| | 2 | TRANS | 4 | 4a | |
| | 3 | {blank} | – | – | |
| | 4 | <more> | – | 5b | |
| 5b (FEATURE STATE) | 1 | f24 | – | | |
| | 2 | f25 | – | | |
| | 3 | f26 | – | | |
| | 4 | <more> | – | 5c | |
| 5c (FEATURE STATE) | 1 | f27 | – | | |
| | 2 | f28 | – | | |
| | 3 | f29 | – | | |
| | 4 | <more> | – | 5a | |
| 6a (DIR STATE) | 1 | NEXT | 11 | 6a | |
| | 2 | CDISP | 12 | 2a | |
| | 3 | EXIT/NORMAL | 13 | 1a | SET SYSTEM LINK TIMER (15 sec) AT SWITCH BEFORE TEARING DOWN THE RADIO LINK |
| | 4 | {blank} | – | – | |
| 7a (CONF MAX STATE) | 1 | DROP | 2 | 3a | 2:2 OR LESS PARTIES IN CALL 3:3 OR MORE PARTIES IN CALL |
| | 2 | {blank} | – | – | DON'T SHOW THE ADD LABEL WHEN MORE THAN 6 PARTIES IN THE CONFERENCE CALL |
| | 3 | HOLD | 5 | 5a | |
| | 4 | <more> | – | 3b | |

STATE-BASED CONTROL OF A TERMINAL USER INTERFACE CONTAINING SOFT-LABELED KEYS

RELATED APPLICATIONS

The present application is related to U.S. patent application Ser. No. 09/295 entitled "Automated Administration System for State-Based Control of a Terminal User Interface," and U.S. patent application Ser. No. 09/272,957 entitled "Feature Access Control in a Display-Based Terminal Environment," both filed concurrently herewith.

FIELD OF THE INVENTION

The invention relates generally to communication systems, and more particularly to communication systems which support wireless mobile telephones or other types of user terminals which include soft-labeled keys (SLKs).

BACKGROUND OF THE INVENTION

Conventional communication systems may be configured to support wireless terminals which utilize SLKs. The functions associated with such keys can be varied under control of a system switch or switch adjunct, such that the same physical key can represent multiple features at different times. This compensates for the typical lack of user interface "real estate" on the wireless terminal by providing full feature access even with many fewer physical keys than, e.g., a corresponding wired terminal supported by the same system. A wireless terminal which incorporates SLKs generally includes a display containing the labels associated with the SLKs. In a conventional premises switching system, updates of these labels are typically explicitly controlled by the switch, e.g., based on predetermined functional modes associated with an operating context of the wireless terminal, and/or in response to commands entered by a user at the wireless terminal.

A significant problem with providing such a context-sensitive soft-labeled wireless terminal is that a number of run time misoperations or service degradations can occur if conventional command and update strategies are used to drive the wireless terminal. For example, if the system switch provides updates on a per-key-depression basis, the switch expends a considerable portion of its processing capacity in simply updating the label context of the SLKs on the wireless terminal. This is undesirable since it reduces system capacity, and since it introduces potentially unacceptable delays in updating the key labels. The latter difficulty may also lead to an interpretative misoperation. For example, assume the user depresses multiple SLKs at the wireless terminal. As a result, the switch sends a collection of updates to the terminal, and the first SLK update is processed and displayed. However, if the user then depresses another one of the SLKs, the switch has no way of knowing if all of the updates have been processed at the terminal, and therefore must impose interpretive assumptions about the terminal labels being displayed at the point in time when an SLK is depressed. This is an undesirable interpretive race condition, since the switch is mapping terminal button identifiers to system feature codes and the identifiers and codes may be desynchronized. Another problem associated with conventional control of SLKs is that a significant amount of bandwidth can be expended in the process of transmitting updates to the wireless terminal, thereby reducing the local radio access efficiency of the system.

A need therefore exists for techniques which allow a communication system switch to control SLKs of a wireless terminal user interface in a more efficient manner, while avoiding the run time misoperations and other problems associated with conventional techniques.

SUMMARY OF THE INVENTION

The invention controls SLKs of a wireless terminal using a downloadable state-based control model. In accordance with an illustrative embodiment of the invention, a state machine is generated such that each state in the state machine specifies a set of labels for a corresponding set of SLKs associated with the wireless terminal. At least a portion of the state machine is downloaded from a switch of the system, and processed to generate a display including a given one of the sets of labels. The state machine may be in the form of a state transition table which includes, for each state, (i) a set of labels for the set of SLKs, (ii) a set of feature identifiers, e.g., system codes, each identifying, for a given one of the labels, a particular feature supported by the switch, and (iii) a next state which is entered when the corresponding SLK is selected by the user. After a given one of the SLKs is selected by a user, the corresponding system code is transmitted from the wireless terminal to the switch.

The state transition table may also support a local mode in which selecting a particular SLK in a given state causes the terminal to execute a specified local subroutine, script, macro or other program, after which the terminal returns to the given state. Updating of the display may be controlled locally by the wireless terminal, or by the switch sending an indication of the next state to the wireless terminal. This will generally depend on the manner in which the state control logic is implemented, e.g., within the switch, a switch adjunct, the terminal, or combinations of these and other system elements.

The use of state-based control of SLKs in accordance with the invention provides a number of advantages over the previously-described conventional approaches, and relieves the switch of much of the overhead associated with operating the wireless terminal user interface. For example, the state-based control model of the illustrative embodiment can resolve update contention by providing local updates based on state, can relieve system congestion by maintaining SLK updates locally in the wireless terminal, can resolve interpretive race conditions by maintaining an explicit set of state-based interpretation assignments locally in the wireless terminal, and can reduce bandwidth consumption by either reducing or eliminating system updates to the wireless terminal user interface. The invention thus significantly reduces the switch processing requirements and transmission bandwidth associated with controlling SLKs on a wireless terminal user interface. Another advantage of the invention is that the SLK labels are fully language-independent, because a correspondence may be established between a character set in the terminal and the state machine. This avoids language-related problems associated with preprogrammed labels. These and other features and advantages of the present invention will become more apparent from the accompanying drawings and the following detailed description.

DETAILED DESCRIPTION OF THE INVENTION

The invention will be illustrated below in conjunction with an exemplary wireless communication system. Although particularly well-suited for use with, e.g., a telephone system which supports both wired deskset terminals and wireless terminals, the invention is not limited to use with any particular type of system or terminal. The disclosed techniques may be used in any communication application in which it is desirable to control terminal state in a processing-efficient and bandwidth-efficient manner. For example, the invention may be applied to handsets for use in cellular and personal communication services (PCS) systems, and to other types of communication terminals, such as wired ISDN terminals. The word "terminal" as used herein should therefore be understood to include not only portable wireless handsets as in the illustrative embodiment, but also other types of communication devices, including personal computers, wired and wireless desksets, optical communication terminals, or any terminal supported by a message-oriented command structure. It should be noted that the invention does not require any particular type of information transport medium, i.e., the invention may be implemented with any desired transport type. The term "switch" as used herein should be understood to include enterprise switches and other types of telecommunication switches, as well as other types of processor-based communication control devices such as servers, computers, adjuncts, etc. The term "table" as used herein is intended to include not only tabular representations as in the illustrative embodiments, but any other type and arrangement of data from which information can be extracted using one or more identifiers. Information stored in an addressable memory is an example of one type of table that may be used in conjunction with the invention. The term "label" as used herein is intended to include text, graphics or other types of user-perceptible information, as well as various combinations thereof. A character string is an example of one type of label that may be used in conjunction with the invention.

Figure 1:
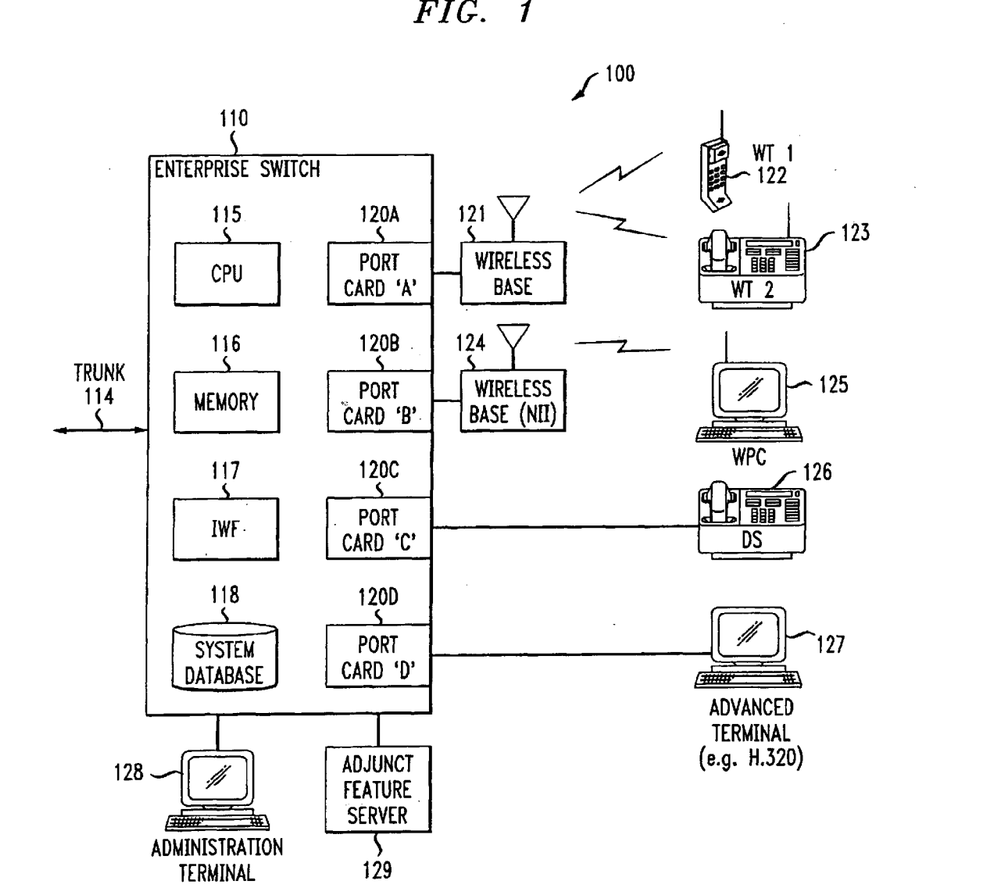
FIG. 1 shows a portion of an exemplary communication system in which the invention may be implemented.

FIG. 1 shows a portion of an exemplary communication system 100 in which the invention may be implemented. The system 100 includes an enterprise switch 110 which receives as an input a trunk 114. The trunk 114 supplies incoming calls to the switch 110 for processing. The switch 110 in this embodiment includes a central processing unit (CPU) 115, a memory 116, at least one interworking function (IWF) 117, and a system database 118. The CPU 115 may be a microprocessor, an application-specific integrated circuit (ASIC) or other type of digital data processor, as well as various portions or combination of such elements. The memory 116 may be a random access memory (RAM), a read-only memory (ROM) or combinations of these and other types of electronic memory devices.

The IWF 117 is used to provide necessary format conversions pertaining to signaling and transport, in a known manner. The IWF 117 may in other embodiments be incorporated into other elements of switch 110, such as the CPU 115 and memory 116. The system database 118 may be used to store, e.g., feature assignments to particular feature buttons, directory number assignments to corresponding call appearances or direct facility termination keys, access restrictions, and other known administrative information regarding the configuration of the system 100, as well as other types of information.

The switch 110 in this example further includes four port cards 120A, 120B, 120C and 120D. Port card 120A is coupled to a wireless base station 121 which communicates with a first wireless terminal (WT) 122 designated WT1 and a second wireless terminal 123 designated WT2. The terminal WT1 may be a mobile telephone, and the terminal WT2 may be a wireless deskset. Port card 120B is connected to a broadband wireless base station, e.g., a National Information Infrastructure (NII) wireless base station 124, which communicates with a wireless personal computer (WPC) 125. Port card 120C is connected to a wired deskset (DS) 126. Port card 120D is connected to an advanced terminal (AT) 127, which may be, e.g., a video telephone operating in accordance with the H.320 standard. It should be noted that the switch 110 may include additional port cards, and may be connected to other types and arrangements of user terminals. The switch 110 is also connected to an administrator terminal 128 which may used to program the operation of the switch 110 during a system administration, e.g., an initial set-up and configuration of the system or a subsequent system-level or user-level reconfiguration.

The system 100 of FIG. 1 includes an adjunct feature server 129. The adjunct feature server 129 may be directly connected to the switch 110 or connected thereto over a network or other suitable transport medium. The adjunct feature server 129 may be used, e.g., to implement state control logic for use in maintaining or otherwise processing a state transition table in accordance with the invention. Although shown as separate from the switch in the embodiment of FIG. 1, an adjunct such as adjunct feature server 129 is considered to fall within the general definition of the term "switch" as given previously. Such an adjunct may be physically incorporated within the switch in other embodiments of the invention, and may be partially or completely implemented using other switch elements such as CPU 115 and memory 116.

Figure 2:
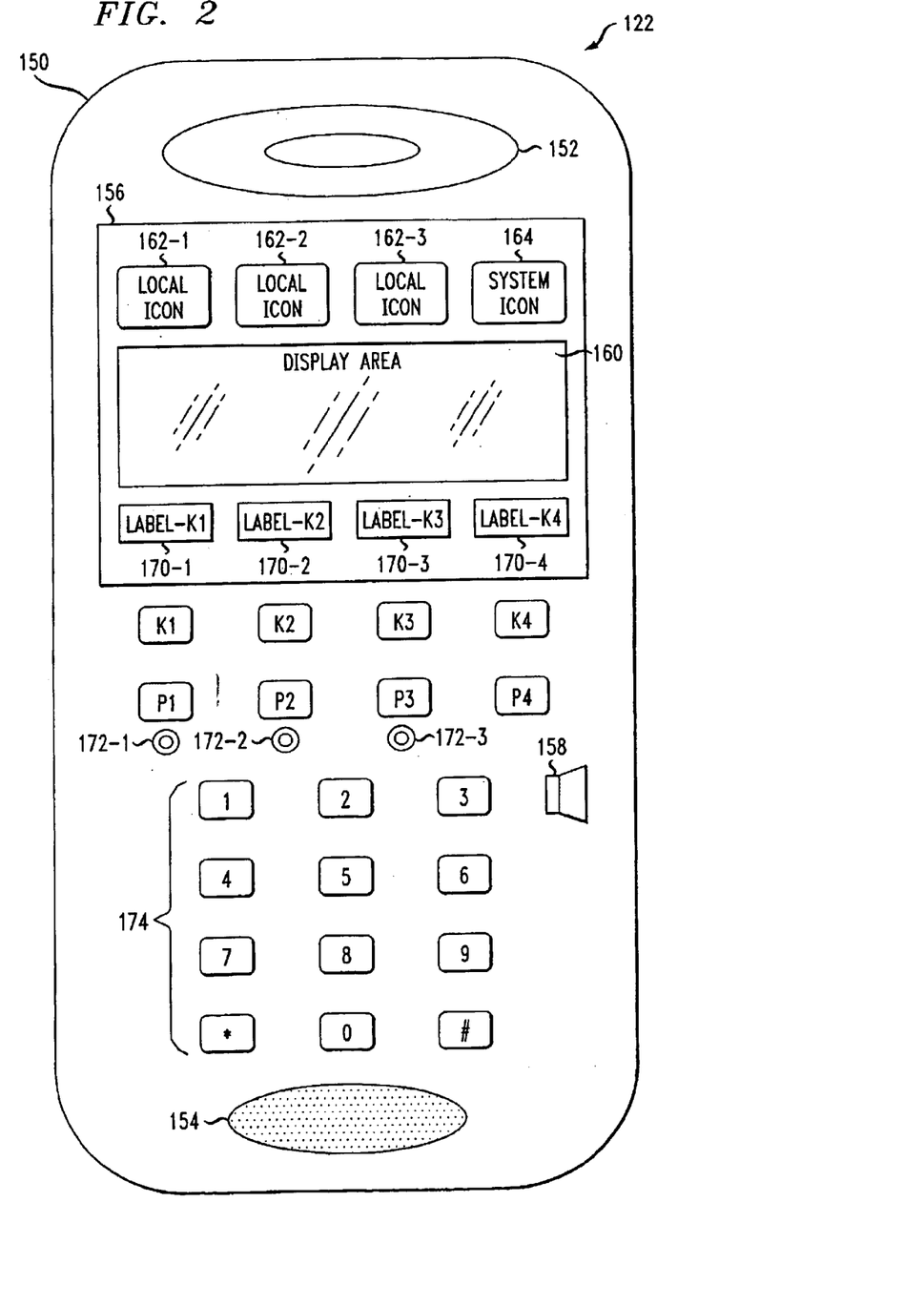
FIG. 2 shows an illustrative embodiment of a wireless terminal configured in accordance with the invention.

FIG. 2 shows a wireless terminal 122, which in the illustrative embodiment of the invention is configured to operate in accordance with a state-based control model. The terminal 122 includes a housing 150 with a speaker 152, a microphone 154, a display 156 and an audio alerter 158. The display 156, which may be an LCD display or other suitable type of display, includes a display area 160, a set of local icons 162-1, 162-2 and 162-3, a system icon 164, and a set of SLK labels 170-1, 170-2, 170-3 and 170-4 which indicate the functions associated with SLKs K1, K2, K3 and K4, respectively. A given physical SLK can have multiple function assignments which vary in accordance with the feature labels, based on the state-based control techniques of the invention to be described in greater detail below.

The local icons 162-1, 162-2 and 162-3 indicate locally-generated status information associated with the wireless terminal, e.g., battery charge remaining, signal strength, etc. The system icon 164 conveys system information supplied to the terminal by the switch. Alternative embodiments could include multiple switch-driven system icons. The wireless terminal 122 further includes buttons P1, P2, P3 and P4, LED indicators 172-1, 172-2 and 172-3, and a conventional set of touch-tone dialpad buttons 174. It should be emphasized that the configuration of wireless terminal 122 as shown in FIG. 2 is for purposes of illustration only, and should not be construed as limiting the invention to any particular type of terminal.

The present invention in an illustrative embodiment provides techniques for controlling the SLKs and their associated labels on the wireless terminal 122. In accordance with the illustrative embodiment of the invention, at least a portion of a user interface state machine is downloaded into the wireless terminal 122 by the switch 110 at, e.g., terminal registration time, and during system operation relieves the switch of much of the overhead associated with operating the wireless terminal interface. The state machine may be in the form of a state transition table or other suitable representation of state transition information. The state machine of the illustrative embodiment resolves update contention by providing local updates based on state, relieves system congestion by maintaining SLK updates locally in the wireless terminal, resolves interpretive race conditions by maintaining an explicit set of state-based button/label interpretation assignments locally in the wireless terminal, and reduces bandwidth consumption by either reducing or eliminating system updates to the wireless terminal interface.

In the illustrative embodiment, the switch can, e.g., re-download the state machine if terminal operation is interrupted for any reason, and/or can update the state machine each time the terminal registers with the switch. The responsibility for maintenance of the state machine may alternatively be implemented entirely within the terminal, or using an approach in which the responsibility is shared between the switch and the terminal. In the latter case, either the switch or the terminal may be designated as a master.

When the wireless terminal 122 is administered, e.g., at system startup, the system 100 creates a state table based on user needs as expressed in feature requirements declared in a station administration form, and based on system knowledge of feature operations. For example, when a conference feature is administered on the SLKs of the wireless terminal 122, a consequential state is created by the system. This state represents those events that are legitimate for the user after activating a conference function, e.g., add another member to the conference, drop a member from the conference, transfer, etc. The transition from the original SLK label screen to the consequential feature state is defined, and the results loaded in the state table. Other features are treated in a similar manner, resulting in the creation of a complete state table covering all of the desired features, and including access to local features.

During this process, feature identifiers that specify, e.g., the system code to access an associated feature, are inserted as data in the state table. These system-based feature identifiers are also referred to herein as system button identifiers (SBIDs). Note that SBIDs represent internal system identifiers for specific switch-based features. As noted previously, the table may also contain local feature identifiers. These local feature identifiers may be interleaved with the system feature identifiers. For example, as will be illustrated in conjunction with FIGS. 5, 6A and 6B, local features may be entered by way of an activity list specifying a subroutine, script, macro or other program to be executed if a user selects a particular SLK in a given state. This directs the terminal to go into a local mode, in which case some or all of its communication with the switch may be suspended. In the illustrative embodiment, when the system is activated and/or when the terminal registers with the switch, the state table is loaded into the wireless terminals. A copy of the table is generally also maintained in the serving switch.

At run time, when a given SLK is depressed, the wireless terminal sends the SBID associated with the currently-displayed label, and, assuming the state machine is locally controlled, updates its own display based on the next set of labels contained in its state table. In an embodiment in which the state machine is controlled by the switch, the wireless terminal may send to the switch an identifier of its current state as well as the SBID, and the switch returns an acknowledgment including an identifier of a new state. The wireless terminal then updates its display based on the next set of labels contained in its state table as specified by the new state identified in the acknowledgment.

Figure 3:
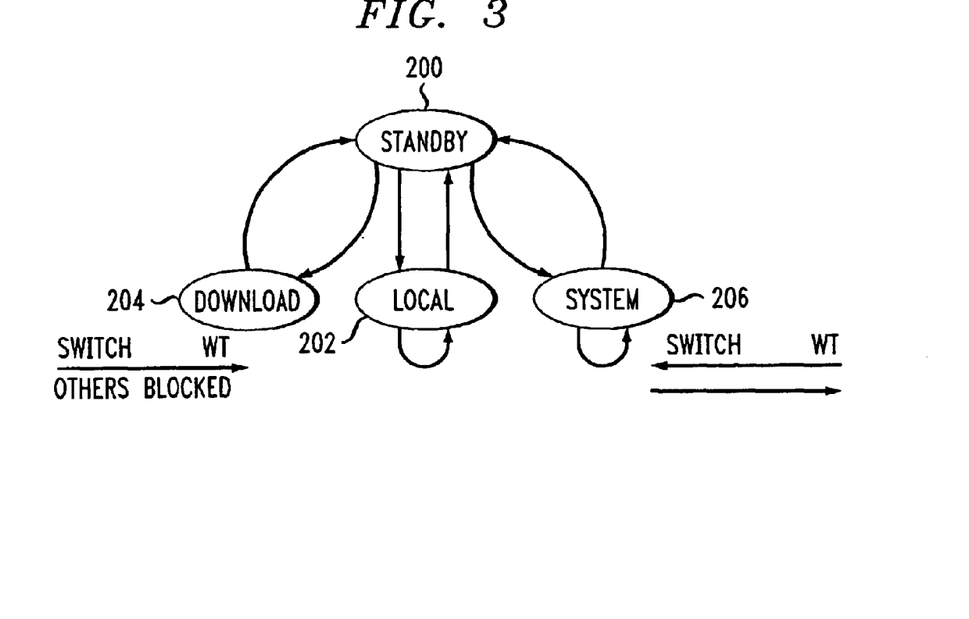
FIGS. 3 and 4 are diagrams illustrating the operating modes and state transitions, respectively, in the wireless terminal of FIG. 2 in accordance with the invention.
Figure 4:
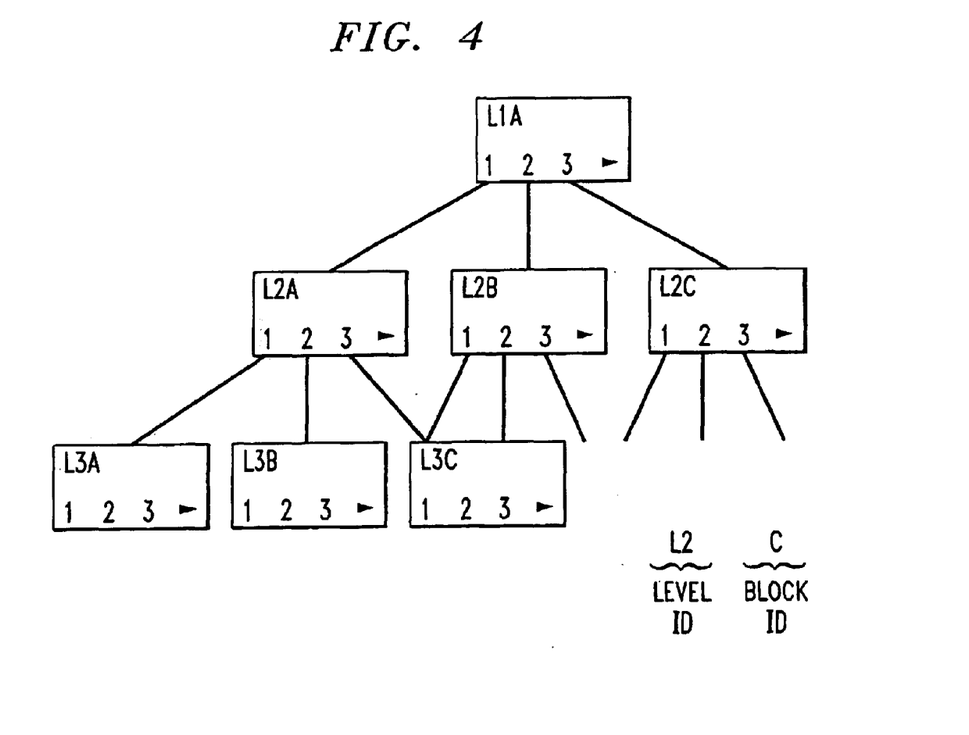

FIGS. 3 and 4 are diagrams illustrating the operating modes and state transitions, respectively, for providing the above-described SLK control in the wireless terminal of FIG. 2 in accordance with the invention. FIG. 3 illustrates the four general operating modes of the wireless terminal 122 relating to the SLK control of the invention. These four operating modes include, e.g., a transitory standby mode 200 in which the wireless terminal is not engaged in any particular activity; a local mode 202 in which the wireless terminal is being manipulated by the user for the purpose of local programming or local feature service; a download mode 204 in which the switch is downloading data into the wireless terminal; and a system mode 206, also referred to as a run-time mode, in which transport channel and feature service are available from the serving switch. In the download mode 204, communication is generally from the switch to the wireless terminal, with the uplink transport channel blocked but bidirectional signaling maintained for acknowledgments and the like, while in the system mode 206 full bidirectional communication between the switch and the wireless terminal is supported.

FIG. 4 shows a diagram in the form of a tree which illustrates state transitions in accordance with the invention. The nodes of the tree are in the form of blocks labeled L1A, L2A, L2B, etc. Each of these blocks corresponds to a particular set of SLK labels, in the general form of the labels 170-1, 170-2, 170-3 and 170-4 in FIG. 2. The first, second and third labels in each set are designated 1, 2 and 3, respectively. The fourth label in each set corresponds to a navigation function, and is designated with a "▶" character. The notation used to identify the nodes in the tree includes a level identifier Ln, where n is the particular level, and a block identifier A, B, C, etc. A given state in the state-based SLK control of the invention corresponds to a node of the tree, and thus a particular set of SLK labels as well as a set of control data, e.g., SBIDs, related to that set of labels. Navigation within the tree is such that pressing an SLK label 1, 2 or 3 results in movement down the corresponding branch to the next node of the tree, while pressing the "▶" character results in movement to the right, i.e., to another segment of the same branch of the tree or to another branch of the tree, depending on the implementation. The movements from state to state within the tree are arranged in accordance with a specified state transition table. Transitions from a current state to the next state may be expressed as follows:

Current State+Transition (SBID)=Next State.

Note that correlating the state with a particular set of labels and SBIDs eliminates the previously-described race condition problem.

Figure 5:
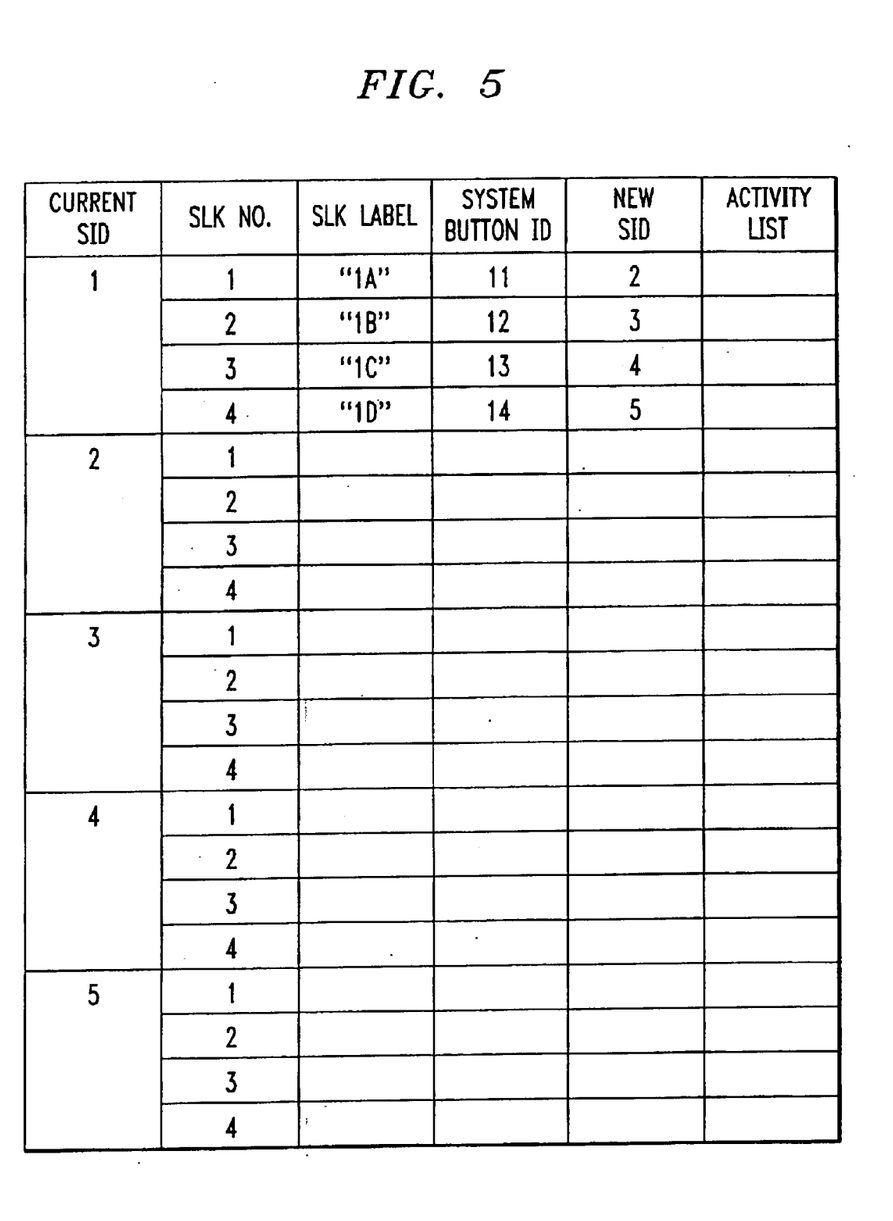
FIG. 5 shows a portion of a state transition table in accordance with the invention.

FIG. 5 shows a portion of a state transition table which may be used to implement the above-described state-based SLK control in accordance with the invention. The table, which is only partially populated in this example, includes a column for the current state identifier (SID), a column for SLK number, a column for SBID, a column for the new SID, and a column for an activity list. Associated with each of five possible current states in this example is a set of SLK labels, including a label for each of the four SLKs. For example, it can be seen from the FIG. 5 table that the SLKs 1, 2, 3 and 4 have been assigned labels 1A, 1B, 1C and 1D, respectively, in the state corresponding to SID 1. The table also includes an SBID for each of these assigned labels, i.e., SBIDs 11, 12, 13 and 14 for labels 1A, 1B, 1C and 1D. The new SID specifies the next state that the state-based control model moves to after the corresponding SLK is depressed by the user. The activity list may include additional relevant information for each entry, or may be eliminated in an alternative embodiment. As an example, the activity list may direct the terminal to enter a local mode and execute a preprogrammed local subroutine, script, macro or other program from a given state, after which the terminal returns to that state. The activity list may also direct the terminal to perform local functions such as memory updates, or attribute and condition adjustments.

Figure 6A:
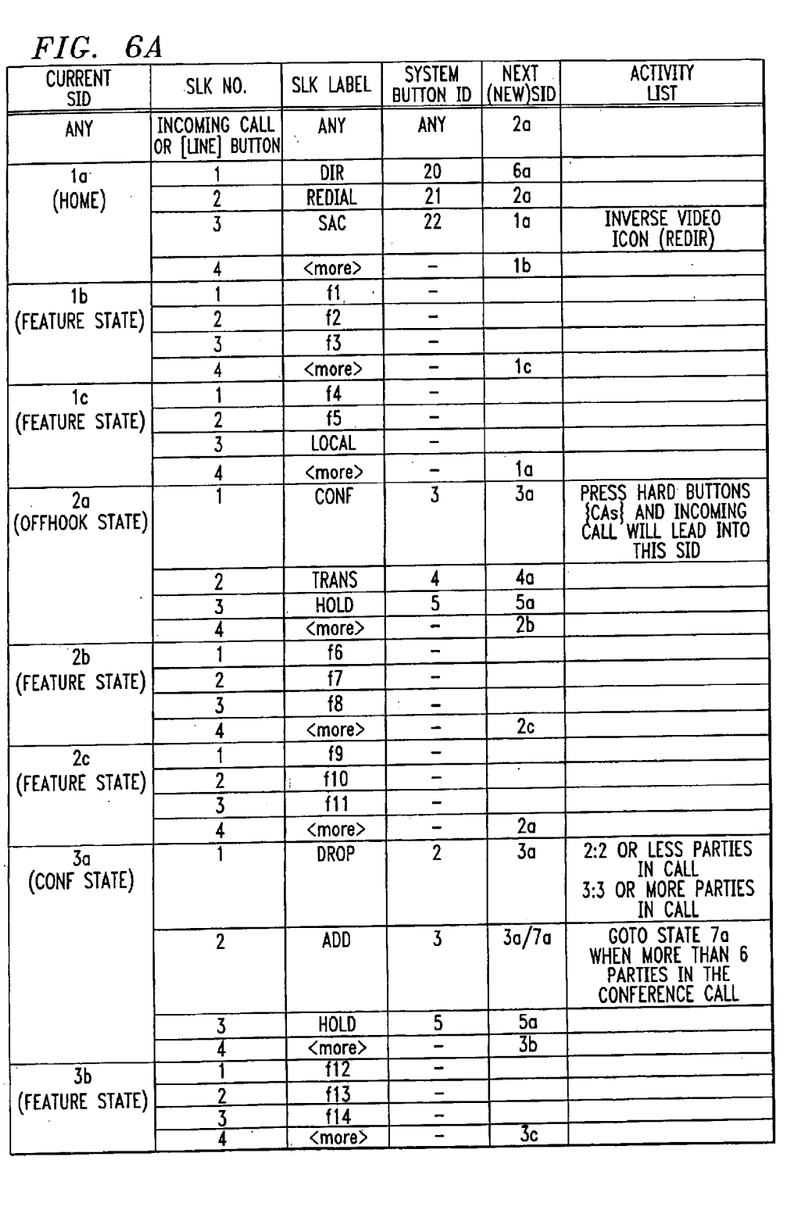
FIGS. 6A and 6B show a more detailed example of a state transition table in accordance with the invention.
Figure 6B:
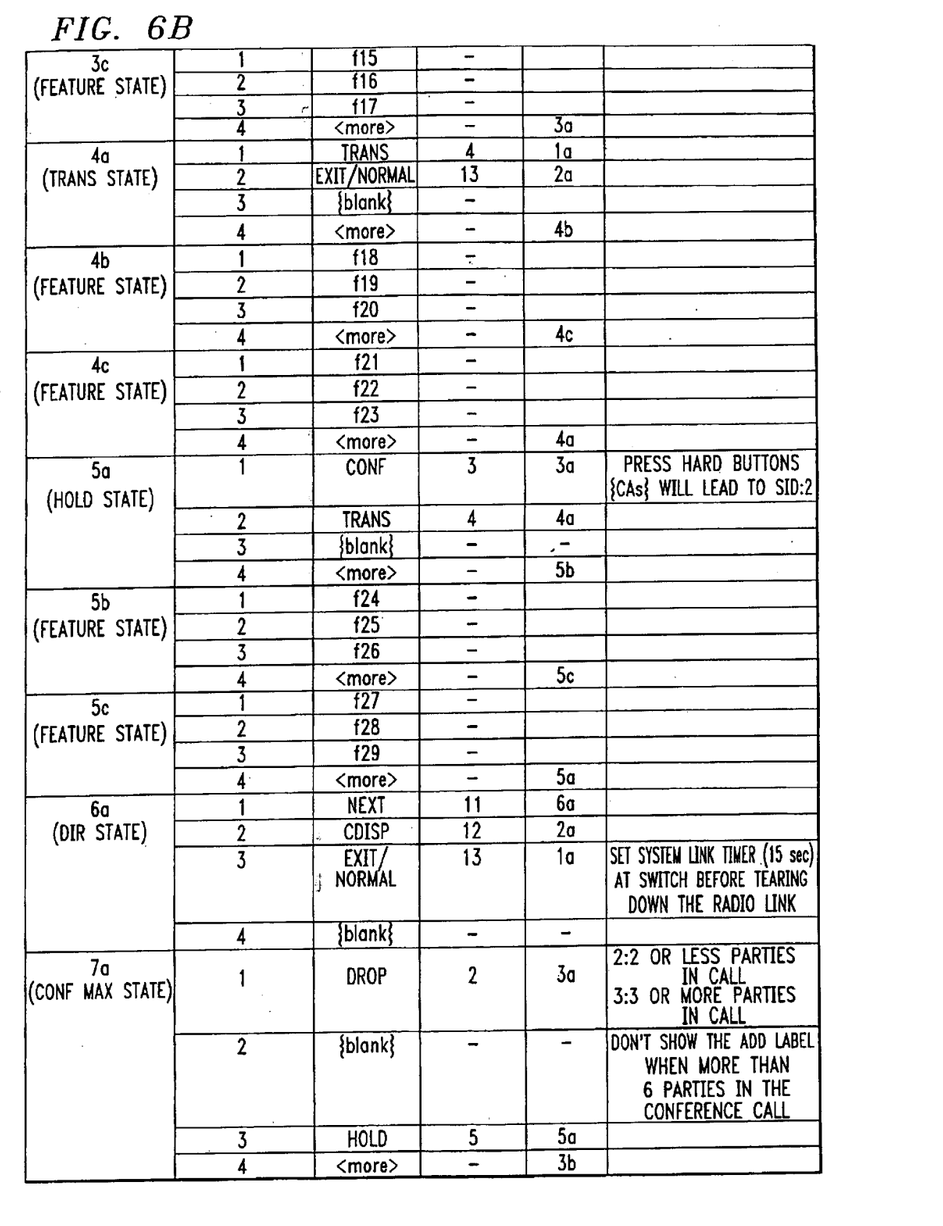

FIGS. 6A and 6B show a more detailed example of a state transition table for controlling SLKs in a wireless terminal in accordance with the invention. This example assumes that the wireless terminal supports a total of seven primary states. These states are designated 1a, 2a, 3a, 4a, 5a, 6a and 7a. Primary states 1a, 2a, 3a, 4a and 5a each include two related states, designated Nb and Nc, where N is the primary state number. Each of the states provides a particular set of labels for four SLKs. For most of the states, three of the SLKs are used for functions or features, and one of the SLKs is used for navigation. The label indicating navigation in this example is the <more> label. The states and their corresponding sets of SLK labels in the example of FIGS. 6A and 6B are as follows:

1a. HOME State:
Dir Redial SAC <more>|1b: f1 f2 f3 <more>|1c: f4 f5 local <more>|
2a. Offhook State:
Conf Trans Hold <more>|2b: f6 f7 f8 <more>|2c: f9 f10 f11 <more>|
3a. Conference State:
Drop Add Hold <more>|3b: f12 f13 f14 <more>|3c: f15 f16 f17 <more>|
4a. Transfer State:
Trans Exit {blank} <more>|4b: f18 f19 f20 <more>|4c: f21 f22 f23 <more>|
5a. Hold State:
Conf Trans {blank} <more>|5b: f24 f25 f26 <more>|5c: f27 f28 f29 <more>|
6a. Directory State:
Next Cdisp Exit {blank}|
7a. Conference Max State:
Drop {blank} Hold <more>|

The set of SLK labels, SBIDs and transitions between the states are all specified in the state transition table of FIGS. 6A and 6B. The various system functions and features referred to in the state transition table, such as directory (Dir), send all calls (SAC), redial, conference (Conf), transfer (Trans), hold, call display (CDisp), etc. are well known in the art and will therefore not be described in detail herein. References to "hard buttons" for call appearances (CAs) refer generally to buttons such as P1, P2, P3 and P4 on wireless terminal 122 of FIG. 2.

The state transition table of FIGS. 6A and 6B allows the terminal to enter a local mode from state 1c, in which SLK No. 3, i.e., SLK K3 of FIG. 2, has a label "local." When the user depresses this key, the terminal enters a local mode and, e.g., executes a preprogrammed local subroutine, script, macro or other program. As previously noted, the activity list portion of the state transition table may include an identifier of the local action to be taken, e.g., an identifier of the local program to be executed, although such an identifier is not explicitly shown in the table of FIGS. 6A and 6B. Alternatively, such an identifier could be included in another column of the table, such as the SBID column. The state transition table could include any desired number and arrangement of local and switch feature labels. For example, a display line for a given state could include multiple local labels, intermixed with switch feature labels in any order. As another example, a given local program could be executed automatically upon entry into a particular state of the state transition table.

It should be noted that in the above-described illustrative embodiments, there are no interpretive race conditions, since system level feature identifiers, e.g., SBIDs, are transmitted to the switch explicitly based on current feature label contents. In addition, bandwidth consumption is greatly reduced, since the maximum response to given feature is a new state identifier, e.g., approximately one octet, compared to the dozens of octets of ASCII character strings typically associated with a display update in a conventional system. Furthermore, feature interpretation and display updates may be substantially eliminated for the system, since the feature identifiers sent by the wireless terminal to the switch do not need to be processed through a switch-based mapping function. Another advantage of the invention is that the SLK labels in the illustrative embodiment are fully language-independent, because there is a correspondence established between a character set in the terminal and the state transition table. This avoids the problems associated with preprogrammed labels, particularly language-related problems. It should be noted that, although illustrated using a wireless terminal, the invention can provide similar benefits in applications involving wired terminals.

The state-based control in the illustrative embodiment may be implemented in whole or in part in a port card in the serving switch, e.g., in port card 120A associated with wireless base station 121 in system 100 of FIG. 1, elsewhere in the enterprise switch 110, e.g., using CPU 115 and memory 116, in the wireless terminal 122, or in the adjunct feature server 129. Other suitable combinations of hardware and/or software may be used to implement the state-based control process in accordance with the invention. The wireless terminal 122 includes suitable circuitry for receiving and decoding information received from the switch 110, and executing the corresponding commands. Such receiving, decoding and execution circuitry may include, e.g., a conventional processor and memory, and may be implemented in a straightforward manner. These and numerous other alternative embodiments within the scope of the following claims will be apparent to those skilled in the art.

What is claimed is:
1. A method of controlling a terminal in a communication system, the method comprising the steps of:
generating information representative of at least a portion of a state machine, wherein each of a plurality of states in the state machine specifies a set of labels for a corresponding plurality of soft-labeled keys of the terminal;
downloading the information representative of the state machine from a switch of the system into the terminal; the state machine being configured to run substantially in its entirety within the terminal, independent of the switch, so as to control assignment of the sets of labels to the soft-labeled keys in response to user input without requiring further information from the switch, and being configured such that a transition between a given pair of states of the state machine in response to the user input automatically alters the assignment of the sets of labels to the soft-labeled keys and causes an identifier of a corresponding switch-based feature to be transmitted from the terminal to the switch; and processing the information in the terminal to generate a display including a given one of the sets of labels.

2. The method of claim 1 wherein the terminal operates in at least the following modes:

a local mode in which the terminal is manipulated by the user for the purpose of local operations;

a download made in which the switch downloads the information representative of the state machine into the terminal; and a system mode in which switch-based features are available at the terminal.

3. The method of claim 1 wherein the information representative of at least a portion of the state machine includes information representative of at least a portion of a state transition table specifying states of the state machine and transitions between the states of the state machine.

4. The method of claim 3 wherein the state transition table includes, for each state in a set of possible states, (i) a set of labels for at least a subset of the plurality of soft-labeled keys, (ii) a set of feature identifiers each identifying for a given one of the labels a particular feature supported by a switch of the system, and (iii) a next state which is entered when the corresponding soft-labeled key is selected by the user.

5. The method of claim 3 wherein the state transition table includes an identifier of a local program to be executed by the terminal in a local mode when a particular one of the SLKs is selected by a user in a particular one of the states.

6. The method of claim 1 further including the step of associating with each of the labels in a given one of the sets of labels a feature identifier identifying a particular feature supported by a switch of the system.

7. The method of claim 6 wherein the feature identifiers comprise system button identifiers (SBIDs).

8. The method of claim 6 further including the step of, after a given one of the soft-labeled keys is selected by a user, transmitting the corresponding feature identifier to a switch of the system.

9. The method of claim 1 further including the step of, after a given one of the soft-labeled keys is selected by a user, updating the display to include another of the sets of labels based on a determination of a next state using the information representative of the state machine.

10. The method of claim 9 wherein the updating step is controlled locally by the terminal.

11. The method of claim 9 wherein the updating step is controlled by a switch of the system, and further including the step of transmitting from the switch to the terminal an indication of the next state.

12. An apparatus comprising:

a terminal operative to store information representative of at least a portion of a state machine, wherein each of a plurality of states in the state machine specifies a set of labels for a corresponding plurality of soft-labeled keys of the terminal, and to process the information to generate a display including a given one of the sets of labels, wherein the information representative of the state machine is downloaded from a switch of the system into the terminal;

the state machine being configured to run substantially in its entirety within the terminal, independent of the switch, so as to control assignment of the sets of labels to the soft-labeled keys in response to user input without requiring further information from the switch, and being configured such that a transition between a given pair of states of the state machine in response to the user input automatically alters the assignment of the sets of labels to the soft-labeled keys and causes an identifier of a corresponding switch-based feature to be transmitted from the terminal to the switch.

13. The apparatus of claim 12 wherein the terminal, after a given one of the soft-labeled keys is selected by a user, updates the display to include another of the sets of labels based on a determination of a next state using the state machine.

14. The apparatus of claim 12 wherein the terminal, after a given one of the soft-labeled keys is selected by a user, receives an indication of the next state from a switch of the system.

15. The apparatus of claim 12 wherein the terminal operates in at least the following modes:

a local mode in which the terminal is manipulated by the user for the purpose of local operations;

a download made in which the switch downloads the information representative of the state machine into the terminal; and a system mode in which switch-based features are available at the terminal.

16. The apparatus of claim 12 wherein each of the labels in a given one of the sets of labels has associated therewith a feature identifier identifying a particular feature supported by a switch of the system.

17. The apparatus of claim 16 wherein the feature identifiers comprise system button identifiers (SBIDs).

18. The apparatus of claim 16 wherein the terminal, after a given one of the soft-labeled keys is selected by a user, transmits the corresponding feature identifier to a switch of the system.

19. The apparatus of claim 12 wherein the information representative of at least a portion of the state machine includes information representative of at least a portion of a state transition table specifying states of the state machine and transitions between the states of the state machine.

20. The apparatus of claim 19 wherein the state transition table includes, for each state in a set of possible states, (i) a set of labels for at least a subset of the plurality of soft-labeled keys, (ii) a set of feature identifiers each identifying, for a given one of the labels, a particular feature supported by a switch of the system, and (iii) a next state which is entered when the corresponding soft-labeled key is selected by the user.

21. The apparatus of claim 19 wherein the information representative of the state transition table comprises the state transition table itself.

22. The apparatus of claim 19 wherein the state transition table includes an identifier of a local program to be executed by the terminal in a local mode when a particular one of the SLKs is selected by a user in a particular one of the states.

23. An apparatus comprising:

a communication system switch having a processor and a memory, the switch being operative to store information representative of at least a portion of a state machine, wherein each of a plurality of states in the state machine specifies a set of labels for a corresponding plurality of soft-labeled keys of a terminal of the system, such that the terminal can process the information to generate a display including a given one of the sets of labels, wherein the information representative of the state machine is downloaded from the switch into the terminal;

the state machine being configured to run substantially in its entirety within the terminal, independent of the switch, so as to control assignment of the sets of labels to the soft-labeled keys in response to user input without requiring further information from the switch, and being configured such that a transition between a given pair of states of the state machine in response to the user input automatically alters the assignment of the sets of labels to the soft-labeled keys and causes an identifier of a corresponding switch-based feature to be transmitted from the terminal to the switch.

24. An article of manufacture comprising:

a machine-readable storage medium storing one or more programs for implementing a method of controlling a terminal in a communication system, wherein the one or more programs when executed generate information representative of at least a portion of a state machine, wherein each of a plurality of states in the state machine specifies a set of labels for a corresponding plurality of soft-labeled keys of a terminal, the information representative of the state machine being downloaded from a switch of the system into the terminal, such that the terminal can process the information to generate a display including a given one of the sets of labels;

the state machine being configured to run substantially in its entirety within the terminal, independent of the switch, so as to control assignment of the sets of labels to the soft-labeled keys in response to user input without requiring further information from the switch, and being configured such that a transition between a given pair of states of the state machine in response to the user input automatically alters the assignment of the sets of labels to the soft-labeled keys and causes an identifier of a corresponding switch-based feature to be transmitted from the terminal to the switch.

\* \* \* \* \*